United States Patent [19]

Barber, Jr.

[11] 4,034,738

[45] July 12, 1977

[54] SOLAR HEATING SYSTEM

[75] Inventor: Everett M. Barber, Jr., Guilford, Conn.

[73] Assignee: Sunworks, Inc., Guilford, Conn.

[21] Appl. No.: 657,618

[22] Filed: Feb. 12, 1976

Related U.S. Application Data

[62] Division of Ser. No. 453,353, March 21, 1974, Pat. No. 3,980,071.

[51] Int. Cl.² .......................................... F24J 3/02
[52] U.S. Cl. ................................ 126/271; 237/1 A
[58] Field of Search ............ 126/270, 271; 237/1 A

[56] References Cited

U.S. PATENT DOCUMENTS

| 2,544,474 | 3/1951 | Swanton, Jr. | 126/271 |
| 3,107,052 | 10/1963 | Garrison | 126/271 |
| 3,250,269 | 5/1966 | Sherock | 126/271 |

Primary Examiner—Kenneth W. Sprague
Assistant Examiner—James C. Yeung
Attorney, Agent, or Firm—DeLio and Montgomery

[57] ABSTRACT

A solar heating system of the liquid heat transfer collector type in which provision is made for circulating the heat exchange medium only, then the collector temperature bears a predetermined relation to the storage medium, and where, a heat exchange liquid dissipating means is provided to dissipate heat in the medium when the collector temperature exceeds a predetermined value.

6 Claims, 4 Drawing Figures

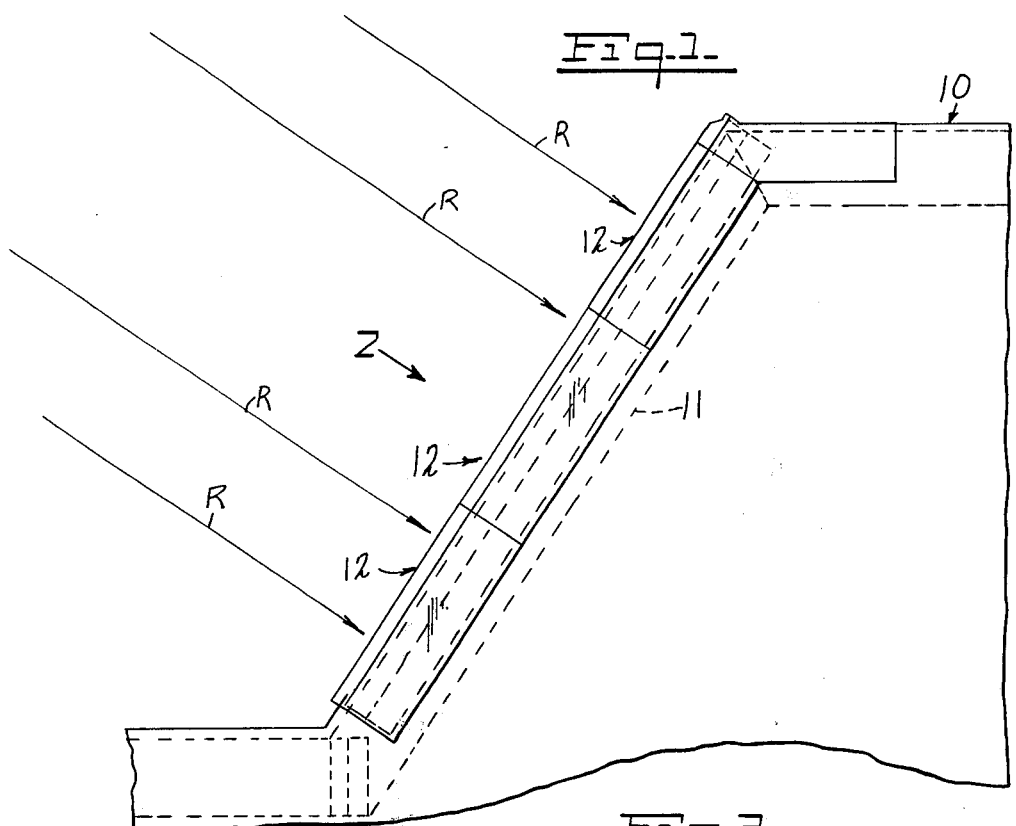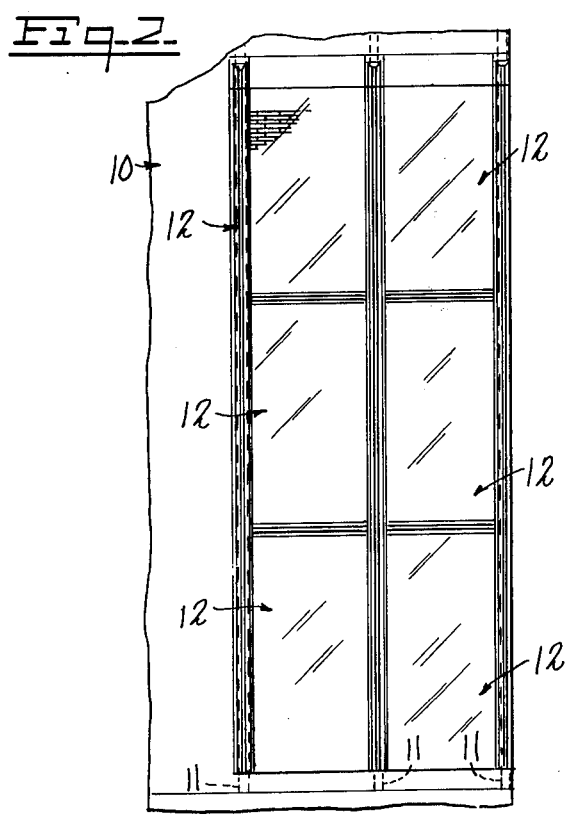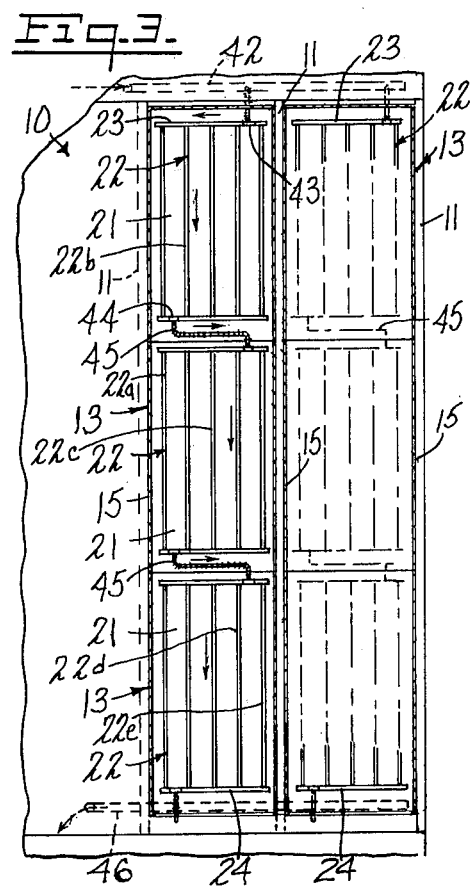

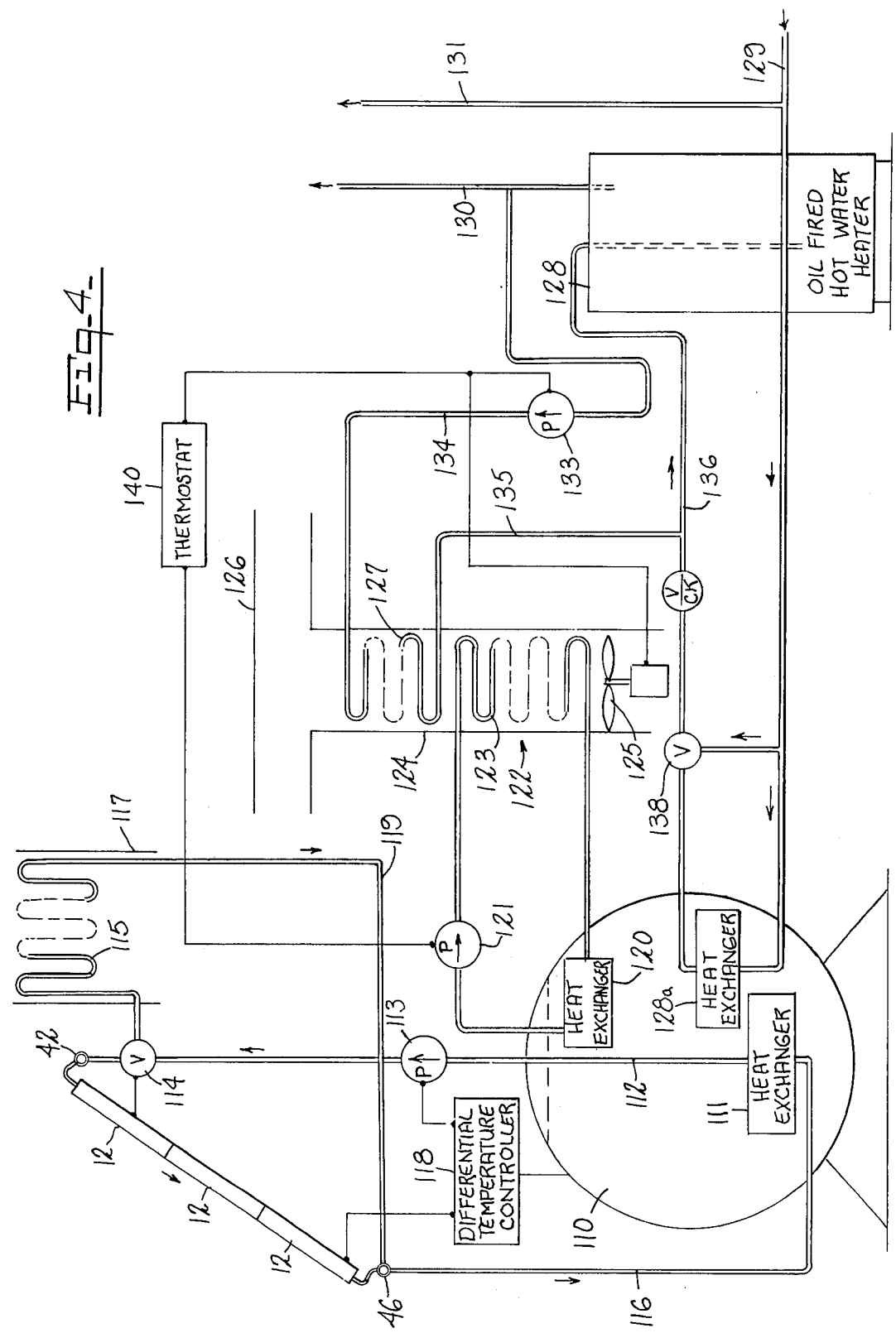

SOLAR HEATING SYSTEM

This application is a division of co-pending application Ser. No. 453,353, filed Mar. 21, 1974, U.S. Pat. No. 3,980,071.

This invention relates to solar heating systems and more particularly relates to solar radiant energy collector panels and systems utilizing such panels.

The utilization of solar radiation to provide heat for a structure has long been proposed and has been utilized in some instances. Basically, solar heating systems utilize a radiation collector disposed to absorb heat from solar radiation, and a heat transfer medium in contact therewith which is moved in heat transfer relation with respect to the collector. The transfer medium is utilized either for heating directly, or in another heat transfer arrangement where the transferred heat is then conducted for heating purposes.

Solar heating systems have not yet found widespread utilization primarily due to the lack of efficiency, which thus requires greater surfaces to collect solar radiation, with resulting increase in original investment. Moreover, custom design and installation has been required in most uses of heating by solar energy.

New and improved solar heating collectors of increased efficiency which may be constructed in module form to facilitate installation and decrease expense are disclosed in co-pending application Ser. No. 453,353, filed Mar. 21, 1974, U.S. Pat. No. 3,980,071.

The present invention is directed to an overall system which utilizes solar collectors of the type in which liquid in a tubular heat exchanger accepts heat energy from a collector panel, and transfers such heat energy to a storage tank.

In a system embodying the invention, heat is stored in a storage tank, and a pump circulates liquid between the collector panel heat exchangers and a heat exchanger in the storage tank. When the temperature of the collector panels exceeds the temperature in the storage tank, a pump is activated to cause the heat exchange liquid to flow through the collector heat exchangers. A heat dissipation coil is provided to by-pass liquid from the collector panel heat exchangers when the temperature of the collector panels reaches or exceeds a predetermined value.

An object of this invention is to provide a new and improved heating system utilizing solar energy.

Another object of the invention is to provide a more efficiently controlled solar heating system.

A further object of this invention is to provide a solar heating system with provision for heat rejection and dissipation under certain circumstances.

The features of the invention which are believed to be novel are particularly set forth and distinctly claimed in the concluding portion of this specification. The invention, however, both as to its organization and operation, together with further objects and advantages thereof may best be appreciated by reference to the following detailed description taken in conjunction with the drawings, wherein:

FIG. 1 is a side elevation of a structure to which a radiant heating system embodying the invention is applied;

FIG. 2 is a view looking in the direction of arrow 2 of FIG. 1;

FIG. 3 is a view similar to FIG. 2 with the protective panels removed; and

FIG. 4 is a schematic diagram of a system utilizing the invention.

A structure 10, such as a portion of a house as exemplified in FIG. 1 includes spaced apart rafters or joists 11. The joists 11 may be the roof or wall joists or rafters on a conventional structure. Spaced between the adjacent joists are a plurality of solar heat collector modules 12. FIG. 2 exemplifies six such modules arranged in adjacent columns of three between three successive rafters. Each of the modules contains a collector plate hereinafter described, adapted to absorb solar heat energy represented by the arrows R. Each of the modules includes a housing member 13 having a bottom pan portion and upstanding side wall members 15. Disposed within the housings along the bottom thereof is a layer of insulating material such as a section of rigid fiber glass. Disposed above the insulation is a solar collector plate 21 which has a coating hereinafter described which will be referred to as a selective surface. Each collector includes a tubular heat exchanger 22 (FIG. 3). Disposed in intimate heat contact relation with plate 21 are a plurality of heat exchange tubes 22a, 22b, 22c, 22d, and 22e which extend in substantially parallel spaced apart relationship between headers 23 and 24.

The plate 21 is preferably of copper or other heat conductive metal and preferably has thereon a so-called selective surface which is designed to permit the absorption of solar radiation by the copper plate and decrease thermal radiation from the plate. The assembly 26 serves the function of inhibiting convective currents of air within the housing above collector plate 21. The assembly 26 is also spaced a small distance, perhaps ⅛ to ¼ of an inch, above the surface of 21 so that it will not conduct heat from plate 21 and act as a radiator.

A transparent cover member 28 is supported above plate 21 and in short spaced relation from assembly 26. Member 28 has its side edges supported on the joists 11 through the flanges 16 and rests on gaskets or seal 29. A border or frame of aluminum extrusion (not shown) may be provided on each cover member 28 for ease of handling and installation.

An assembly of six modules in two columns between three successive joists is exemplified in FIG. 2. FIG. 3 shows the same modules with the cover and seals removed. The heat exchange tubes 22a – 22e of each module extends substantially parallel between end headers 23 and 24. The heat exchangers 22 are preferably of copper for greatest heat exchange efficiency. As shown, the end headers 23 of the uppermost modules are connected to a manifold 42 and the lower headers 24 are connected to the upper header of the next lower module. The headers 23 and 24 are provided with T-connectors or stubs 43 and 44 between which is led a flexible or bendable tubing connector 45 to provide connection between adjacent heat exchangers. The lower header 44 of the last heat exchanger in a column is connected to a return manifold 46.

FIG. 4 exemplifies a system embodying the invention. A large water storage tank 110 holds a large reservoir of water for heat exchange purposes. The solar heating piping system includes a heat exchanger 111 in tank 110, a line 112 from heat exchanger 111 leads through a pump 113 to a temperature responsive directional valve 114. Valve 114 will direct the heat exchange medium to either a heat dissipating coil 115 or to manifold 42. After passing through the collectors, the heat exchange medium enters manifold 46 and returns to heat exchanger 111 through line 116. Valve 114 is responsive to the temperature of the fluid. If the fluid temperature exceeds a predetermined value, for example 220° F, valve 114 directs the heat exchange medium through the heat rejection of dissipating coil. Coil 115 is preferably finned, not shown, and disposed in a belvedere 117 or at a vent. The heat in coil 115 may be used to provide a stack effect for building exhaust.

A differential temperature controller 118 senses the temperature of the collector plates and the water temperature in tank 110. Whenever the collector plate temperature exceeds the water temperature by a predetermined amount, for example 5° F, the controller turns on pump 113.

A second heat exchanger 120 is disposed within tank 110 and furnishes hot water or other heat exchange medium to a heating system. Water heated in heat exchanger 120 is conveyed by means of a pump or circulator 121 to a heating system which may comprise one or more fan-coil heating units 122. The units 122 include one or more heat exchange coils 123 disposed in a housing 124. A motor driven fan 125 may move air over the coils, as shown, or be positioned for drawing air over the coils. As fan 125 blows or draws air over coil 123, the heated air is conveyed via duct work 126, to various areas to be heated. Housing 124 contains a further air heating coil 127, connected to a standby and domestic hot water heater 128. Heater 128 may receive heated water from heat exchanger 128a in tank 110 and supplies domestic hot water through line 130. Domestic cold water is supplied over line 131. Water is supplied to heat exchanger 128a in tank 110 through supply line 129 from a well or other water source. Heated water is returned to tank 128 through a tempering valve 138 and line 136 which may mix cold water from line 129 to maintain the water in heater 128 at a predetermined temperature, for example 140° F.

Whenever the temperature of the water in tank 110 falls below the predetermined temperature, heater 128 commences to operate to heat the water in heater 128. Heater 128 will also supply hot water through pump 133 over line 134 to coil 127 for standby operation upon demand, as hereinafter described. A return line 135 from coil 127 leads to tank return line 136.

In operation during a usual heating period, the differential temperature controller 118 will sense that the collector temperature is higher than that of the water in tank 110. This will cause pump 113 to operate and the heat exchange medium will be conveyed through valve 114 and through the collectors. The heat exchange medium absorbs heat from the collctors and returns to heat exchanger 111 in tank 110 to heat the water therein. If for any reason the temperature of the collectors or the fluid exceeds a predetermined value as previously specified, pump 113 is turned off. Valve 114 will connect the collector coils to a dissipating coil 115. The fluid will then circulate from coil 115 through conduit 119 back through the collectors. This direction of fluid is due to the hotter less dense fluid in the collectors rising and the cooler more dense fluid falling after passing through coil 115. This will maintain the water in tank 110 in a predetermined temperature range suitable for heating. Alternatively, the pump 113 may be operated to direct fluid from heat exchanger 111 through coil 115. In such an arrangement, the conduit 119 would return to heat exchanger 111. When heating is called for, pump 121 will draw water from heat exchanger 120 through heating coil 123 and air blown over the coil 123 by fan 125 may be used for heating purposes. It will be understood that in some instances it may be preferable to use hot water baseboard heating or radiant floor heating rather than the fan coil unit disclosed.

A thermostat 140 is provided to control operation of pump 121 and 133 when heat is called for. When thermostat 140 calls for heat for a given space, only pump 121 and fan 125 will initially operate. If the space temperature continues to fall, then pump 133 will also operate. Fan 125 will continue to operate in response to thermostat 140 calling for heat.

The system as disclosed is generally designed to provide a given percentage of the total heating requirements for a structure from solar energy. The domestic hot water heater is selected to be of a size to supply the design heat loss of a structure plus a given percent thereof for domestic water heating.

The system of FIG. 4 includes a first closed system for the solar heat exchange medium, and a second system for the heating water. The heat exchangers 111 and 120 within tank 110 may be of the conventional coil type or any suitable construction for the water in tank 110 to accept heat from exchanger 111 and give heat up to exchanger 120.

The heat exchanger 120 is optional. For greater efficiency, exchanger 120 may be eliminated, and the heated water in tank 110 may be pumped directly to units 122.

It may thus be seen that the object of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiment of the invention and modifications to the disclosed embodiment which do not depart from the spirit and scope of the invention.

What is claimed is:

1. A solar energy heating system, comprising a solar heat absorber, a heat storing device, means for utilizing heat in said storing device, a heat exchange medium for transporting heat from said absorber to said storing device, a heat dissipating means, first and second conduit means for conveying the heat exchange medium between said absorber and said heat storing device, third conduit means operatively connectable between said first and second conduits to bypass to medium in said absorber from said storing device, said third conduit means including said dissipating means, means for normally circulating the medium through said first and second conduit means between said absorber and said storage device, and means responsive to the temperature of the medium reaching a predetermined value for connecting said third conduit means to pass said heat exchange medium from said absorber through said dissipating means.

2. The system of claim 1 wherein said medium is liquid and tubing conducting said liquid is in intimate heat exchange relation with said absorber, said tubing being connected between said first and second conduits.

3. The system of claim 2 further including means for sensing the temperature of said panel, and means responsive to said absorber sensing means for circulating the liquid between said absorber and said storage device via said first and second conduits only when the temperature of the absorber is greater than that of the storage device.

4. The system of claim 3 in combination with a structure, said dissipating means being positioned with respect to said structure adjacent an opening therein to provide a stack effect for exhausting said structure.

5. The system of claim 2 wherein said storage device stores liquid, and a heat exchanger in said storage device is connected between said first and second conduits.

6. The system of claim 2 wherein said storage device contains liquid and further including means for comparing the temperature of said absorber and the temperature of the liquid in said storage device, and means responsive to said comparison means for circulating fluid between said storage device and said tubing when the temperature of said panel is greater than the temperature of the liquid in said storage device.

* * * * *

UNITED STATES PATENT AND TRADEMARK OFFICE
CERTIFICATE OF CORRECTION

PATENT NO. : 4,034,738
DATED : July 12, 1977
INVENTOR(S) : Everett M. Barber, Jr.

It is certified that error appears in the above-identified patent and that said Letters Patent are hereby corrected as shown below:

Column 2, line 30, cancel "The assem-" through line 43 in its entirety.

Column 3, line 6, "of" should read --or--.

Column 3, line 52, "collctors" should read --collectors--.

Column 4, line 39, "embodiment" should read --embodiments--.

Column 4, line 40, "embodiment" should read --embodiments--.

Column 4, line 9 of claim 1, "bypass to" should read --bypass the--.

Signed and Sealed this

Fourth Day of October 1977

[SEAL]

Attest:

RUTH C. MASON
Attesting Officer

LUTRELLE F. PARKER
Acting Commissioner of Patents and Trademarks